Figure 4:
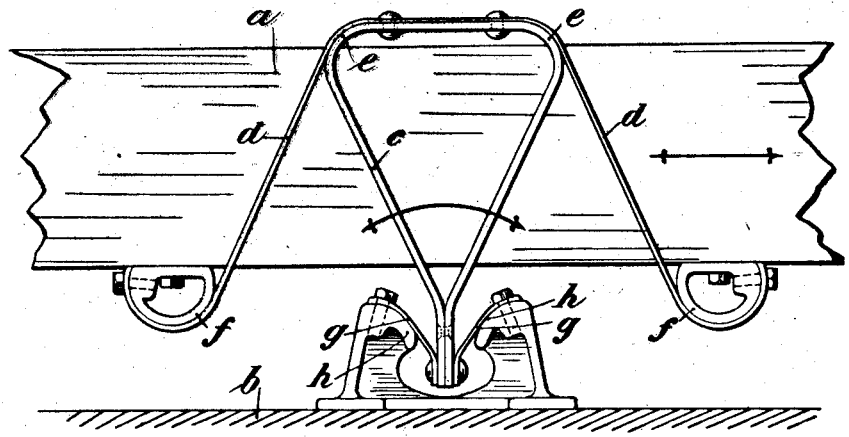

No. 736,753. PATENTED AUG. 18, 1903.
H. MARCUS.
APPARATUS FOR THE TRANSPORT OF MATERIALS.
APPLICATION FILED JULY 15, 1901.
NO MODEL. 3 SHEETS—SHEET 1.
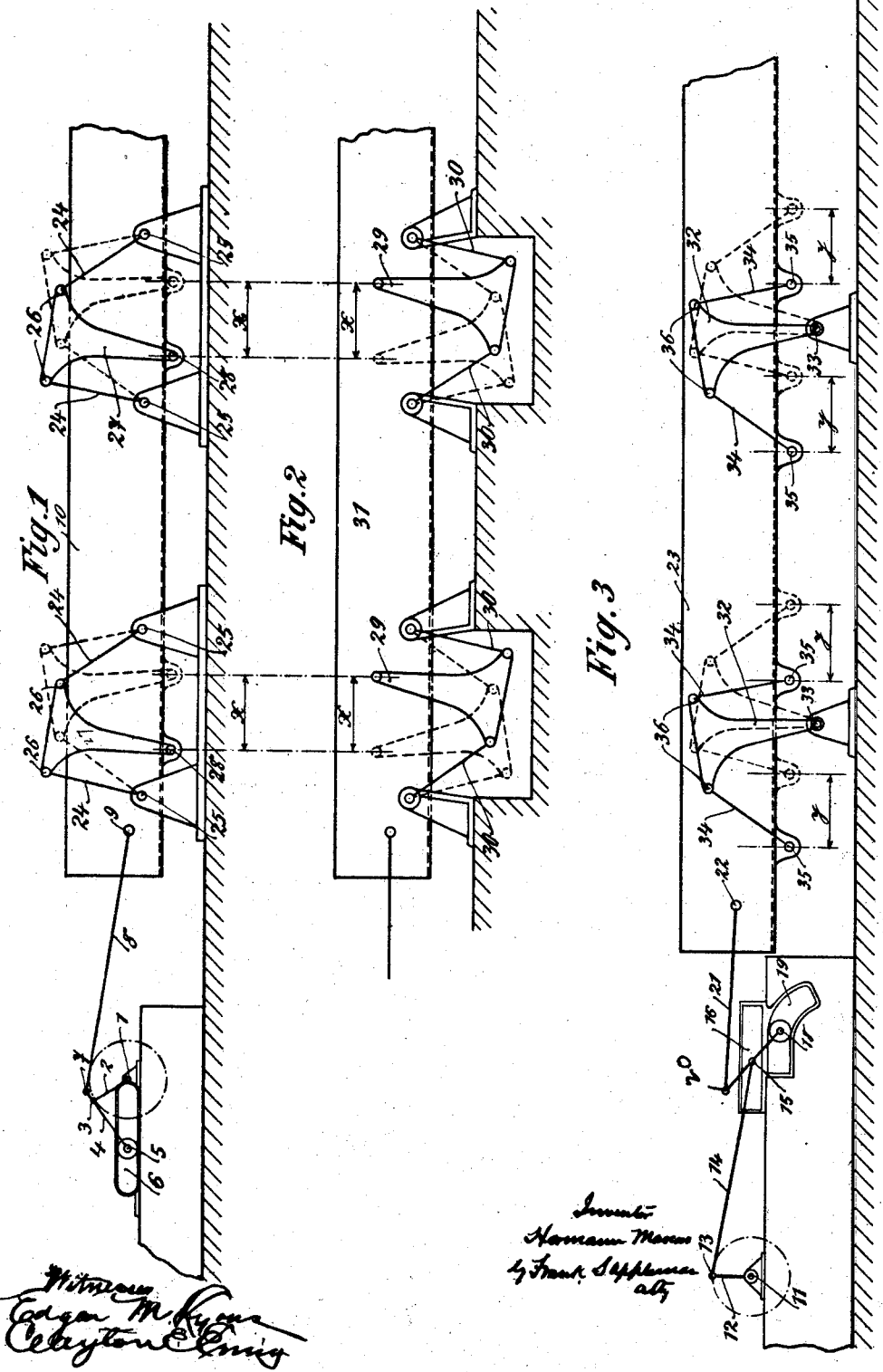

No. 736,753. PATENTED AUG. 18, 1903.
H. MARCUS.
APPARATUS FOR THE TRANSPORT OF MATERIALS.
APPLICATION FILED JULY 15, 1901.
NO MODEL. 3 SHEETS—SHEET 2.

No. 736,753. PATENTED AUG. 18, 1903.
H. MARCUS.
APPARATUS FOR THE TRANSPORT OF MATERIALS.
APPLICATION FILED JULY 15, 1901.
NO MODEL. 3 SHEETS—SHEET 3.

No. 736,753.

Patented August 18, 1903.

UNITED STATES PATENT OFFICE.

HERMANN MARCUS, OF COLOGNE, GERMANY.

APPARATUS FOR THE TRANSPORT OF MATERIALS.

SPECIFICATION forming part of Letters Patent No. 736,753, dated August 18, 1903.

Application filed July 15, 1901. Serial No. 68,345. (No model.)

*To all whom it may concern:*

Be it known that I, HERMANN MARCUS, engineer, a subject of the King of Prussia, Emperor of Germany, residing at Karolingerring 32, Cologne-on-the-Rhine, in the Kingdom of Prussia and Empire of Germany, have invented certain new and useful Improvements in Apparatus for the Transport of Materials, of which the following is a full, clear, and exact description.

This invention relates to an arrangement of apparatus for transporting or conveying materials, solid, semifluid, fluid, or in powder.

The principle of this invention corresponds with that of the application of the 8th of September, 1900, Serial No. 31,399; and it consists in causing the support—conveying-trough, for example—to be guided in straight direction and causes the traveling movement of the material to receive during the principal part of each forward stroke a uniform or practically uniform acceleration in the direction of its travel or so that in the return stroke the support is actuated with a corresponding quick and uniformly-retarded movement during the principal part of the return stroke under the material or so that both these methods of operation may take place alternately in regular succession and that in order to utilize the constant friction of the material on its support in its full amount for the conveying purpose.

The following description refers to a specially suitable means for operating the moving support to effect the required object, as well as to a corresponding method of guiding the support, which is fitted with guides of the kind which it is preferred to use.

In the accompanying drawings such a complete apparatus is shown in Figures 1 to 3, while Figs. 4 to 7 show the parts separately.

Since, as has been clearly explained, the support during the principal part of the working stroke must give a uniform or practically uniform acceleration of speed to the material, with a corresponding quick and uniformly-retarded movement under the material, the driving apparatus must be suitably made and arranged—that is to say, there must be a determined point which effects this working and to which the connecting-rod which effects the movement of the trough is connected. A point answering this requirement is attained by the use of a double-armed lever connected to a point in an ordinary crank movement, a second point of the lever being supported and guided in a corresponding guide, so that the third point, serving as the connecting-point of the connecting-rod, has the required movement.

The crank 2, fixed upon the crank-shaft 1, is jointed at the point 3 to a double-armed lever 4. The end 5 of the lever moves in a guide 6 in such manner that its end 7, to which the connecting-rod 8 is pivoted in such manner, that during each revolution of the crank 2 the distance of the point 7 from the center of the crank-shaft 1 changes from a minimum to a maximum, and back. The connecting-rod 8 is pivoted at 9 to the trough 10, and the changing speed of motion of the end 7 of the lever 4 imparts to the trough 10 a uniformly-accelerated movement in its forward stroke and a corresponding uniform retardation in its back stroke.

In the construction shown in Fig. 3 the same principle is made use of. The gear consists in this case of the crank-shaft 11, crank 12, at the point 13 of which a connecting-rod 14 is jointed, and the cross-head 15, working in a straight guide 16. At the point 15 the double-armed lever 17 is jointed, and its end 18 is so guided in a guide 19 that the point 20, to which the connecting-rod 21 is jointed, has the required movement and by means of the connecting-rod 21 transmits the same movement to the point 22, where the rod is jointed to the trough. If the length of the connecting-rod 14 in this arrangement be supposed to be infinitesimal, so that the points 13 and 15 coincide, a similar arrangement to that shown in Fig. 1 is arrived at. The difference in the two constructions consists only in the diversity of the crank-gear.

A further requirement in the apparatus is, as already pointed out, the guiding in a straight path of the supports which effect the movement or transporting of the material in the required direction. This is effected by suspending the supports upon triangular or T-shaped levers fulcrumed by the extremity of the central arm and connected by links from the two lateral extremities to suitable supports, so as to compensate for the arc movement of the supporting-links. Different methods of using this system of suspension are possible, as shown in Figs. 1, 2, and 3. The link-bars 24, Fig. 1, turn in bearings at their ends 25 and carry at their other ends 26 suspending pieces or plates 27, upon the points 28 of which the trough 10 is suspended. During the oscillating movement described the points 28 move in straight lines, so that the trough is also made to move in a straight line in the required direction backward and forward, as shown by the arrows $x$.

In Fig. 2 the suspending-pieces 29 are inverted and the link-bars 30 hang downward. In this form of arrangement the suspending-links are in tension.

Instead of as in Fig. 1 in the suspending arrangement in Fig. 3 the pieces 32 are carried at their lower ends 33 in bearings on the foundation, while the link-bars 34 are jointed to the trough 23 at the points 35, and the requisite movement takes place in a straight line, as shown by the arrows $y$. The points 36 of the pieces 32 are connected and jointed to the link-bars 34 in any suitable way.

Figure 7:
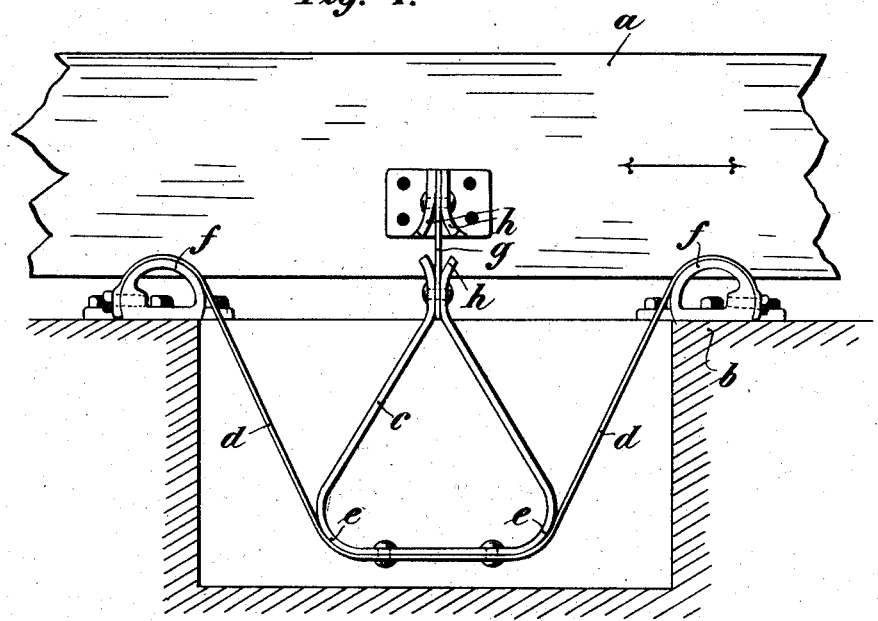

In order to reduce as far as possible the number of joints, the link-bars 24, 30, and 36 of the suspending apparatus may be made flexible—in the form, for example, of springs, bands, or straps, or the like, which during the working of the apparatus bend or roll on and off properly-shaped curved guiding-surfaces. Figs. 4 and 7 show arrangements of this kind.

The conveying-trough is shown at $a$, the foundation at $b$, the side pieces or plates on the triangle system at $e$, and the suspending-bars, which in these forms are hanging-links, at $d$. As shown in the drawings, the links are formed of flat springs or bands, but they may also be made of ropes or in other flexible forms. The connection of the suspending-links $d$ with the trough $a$ and with the plates $e$ is not made with bolts or pivots, but for this purpose curved supports $e$ and $f$ are used, around which the ends of the flexible suspending-links are bent. These ends are firmly fastened by screws or other suitable means, so that they cannot slip off the supports.

Figure 6:
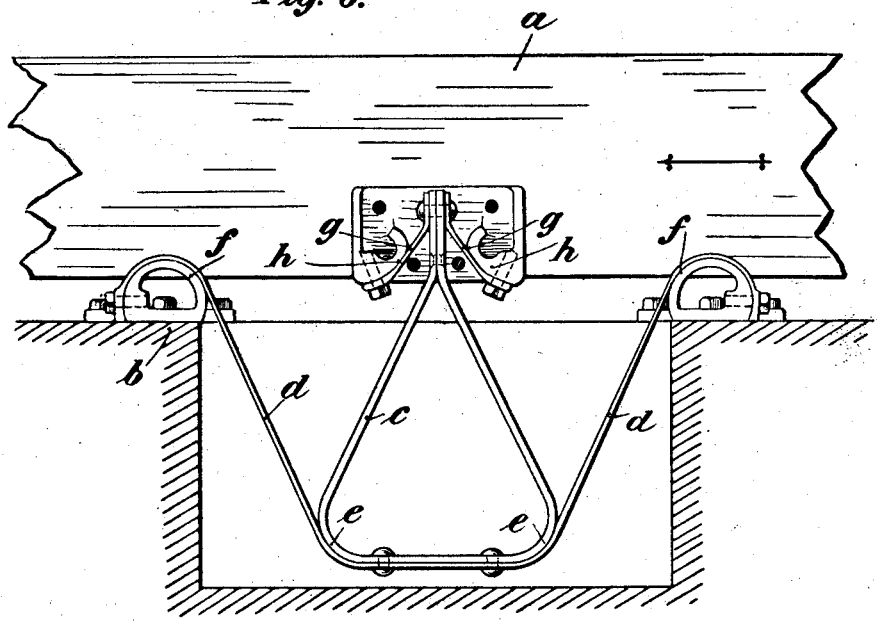
Figure 5:
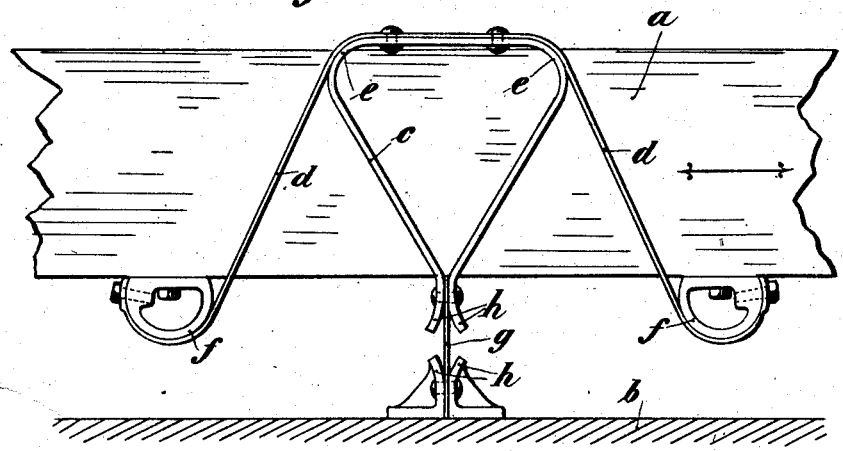

In the arrangement shown in Figs. 4 and 5 the curved supports are immovably fixed upon the trough, while in Figs. 6 and 7 they are fixed upon the foundation.

If the trough $a$ is worked backward and forward in a longitudinal direction, the guiding-links, as above described, work in such manner that they guide the trough backward and forward in a straight line. Moreover, the points 28, Fig. 1, must not only be made as bolts or pivots, but they must also be made in the manner shown in Figs. 4 to 7.

In Figs. 4 and 6 are shown two flexible springs or other flexible links $g$, the upper ends of which fit around the curved supports in the same way as the suspending-links $d$ fit around the curved supports $f$ and $e$, and their outer ends are in the same way fixed and prevented from slipping. When working, the part $g$ rolls alternately on and off the curved supports $h$ in the same way as already described with regard to the suspending-links $d$.

In Figs. 5 and 7 instead of two flexible connecting-links $g$ only one is used, which when working bends alternately to the right and to the left on the curved supports $h$ provided for the purpose.

Such a suspending apparatus has the important advantage that there is little attention needed, as no lubrication is necessary, and there is little wear of the separate parts, so that the cost of repair is prevented. More especially also in conveyers of considerable length the use of the improved suspension apparatus affords great advantages.

I claim—

1. In an apparatus for conveying materials, the combination of a carrying-trough; means for supporting said trough, and guiding it in an approximately right line, while permitting its longitudinal reciprocating motion; a driving-crank; a power-transmitting lever with which the crank is pivotally connected intermediately of the ends of said lever; a rod connecting one end of said lever with the carrying-trough; and a guide by which the movement of the opposite end of said lever is permitted and controlled, substantially as herein described; whereby the carrying-trough is impelled with a uniformly-accelerated motion in its forward stroke and returned with a movement quick at first and uniformly retarded toward the end of the backward stroke.

2. In an apparatus for conveying materials, the combination of a carrying-trough; rocking triangular supports by which said trough is guided in an approximately right line; a driving-crank; a power-transmitting lever to which the crank-pin is pivoted intermediately of the ends of said lever; a guide for one end of said lever by which its movement is controlled, and a rod connected to the opposite end of said lever and to the carrying-trough; whereby reciprocating motion is imparted to said trough with uniformly-accelerated speed in its forward stroke and retarded speed in its return stroke, substantially as described.

In witness whereof I subscribe my signature in presence of two witnesses.

HERMANN MARCUS.

Witnesses:
CHARLES LE SIMPLE,
CARL SCHMITT.